Jan. 10, 1961 W. R. HARPER, JR., ET AL 2,967,920

THERMOSTATIC SWITCH

Filed Dec. 1, 1958

Walter R. Harper, Jr.
Curtis F. Kruger,
Inventors.
Koenig and Pope
Attorneys.

United States Patent Office 2,967,920

Patented Jan. 10, 1961

2,967,920

THERMOSTATIC SWITCH

Walter R. Harper, Jr., Barrington, R.I., and Curtis F. Kruger, North Attleboro, Mass., assignors to Texas Instruments Incorporated, Dallas, Tex., a corporation of Delaware Filed Dec. 1, 1958, Ser. No. 777,298

10 Claims. (Cl. 200—113)

This invention relates to thermostatic switches, and more particularly to thermostatic circuit breakers of a type including a dished snap-acting thermostatic disc as the thermostatic element thereof.

The invention is particularly concerned with a thermostatic circuit breaker of the class described for use as a protector for a three-phase alternating current motor connected in a so-called three-phase four-wire electrical system. The protector essentially comprises a base, a snap-acting thermostatic element, more particularly a dished snap-acting thermostatic disc, and means for supporting the disc at its center on the base. The disc has three contacts on the high expansion side thereof adjacent its periphery engageable with three fixed contacts on the base. The three phase windings of the motor are connected to the three fixed contacts, and the fourth or neutral wire of the four-wire system needs to be electrically connected to the center of the disc in such manner as to establish current paths between each disc contact and the neutral wire when the disc is in circuit-closing position. Electrical connection must be made between a central surface portion of the disc and the neutral wire without rigidly fixing the center of the disc (which would impede its snap action), and without rigidly restraining rotation of the disc on its axis. This precludes any possibility of direct bonding to the disc for making the neutral wire connection. Also, the electrical connection, at least when the disc is in circuit-closing position, must be a low electrical resistance connection in comparison to the resistance measured across any two of the contacts on the disc. The provision of a low electrical resistance connection is complicated by the fact that the surface of the disc is usually of relatively high electrical resistance, due to having a mat finish thereon or due to oxide film.

Accordingly, among the several objects of the invention may be noted the provision of a construction particularly suitable for a motor protector of the class described, though not limited to such use, which attains a low electrical resistance connection between the center of the disc and the neutral wire without rigidly fixing the center of the disc and without rigidly restraining rotation of the disc on its axis; and the provision of such a construction which is economical to manufacture and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan of a motor protector of this invention;

Corresponding reference characters indicate corresponding parts throughout the several views of the drawings.

Figures 1, 2, 3, 4, 5:
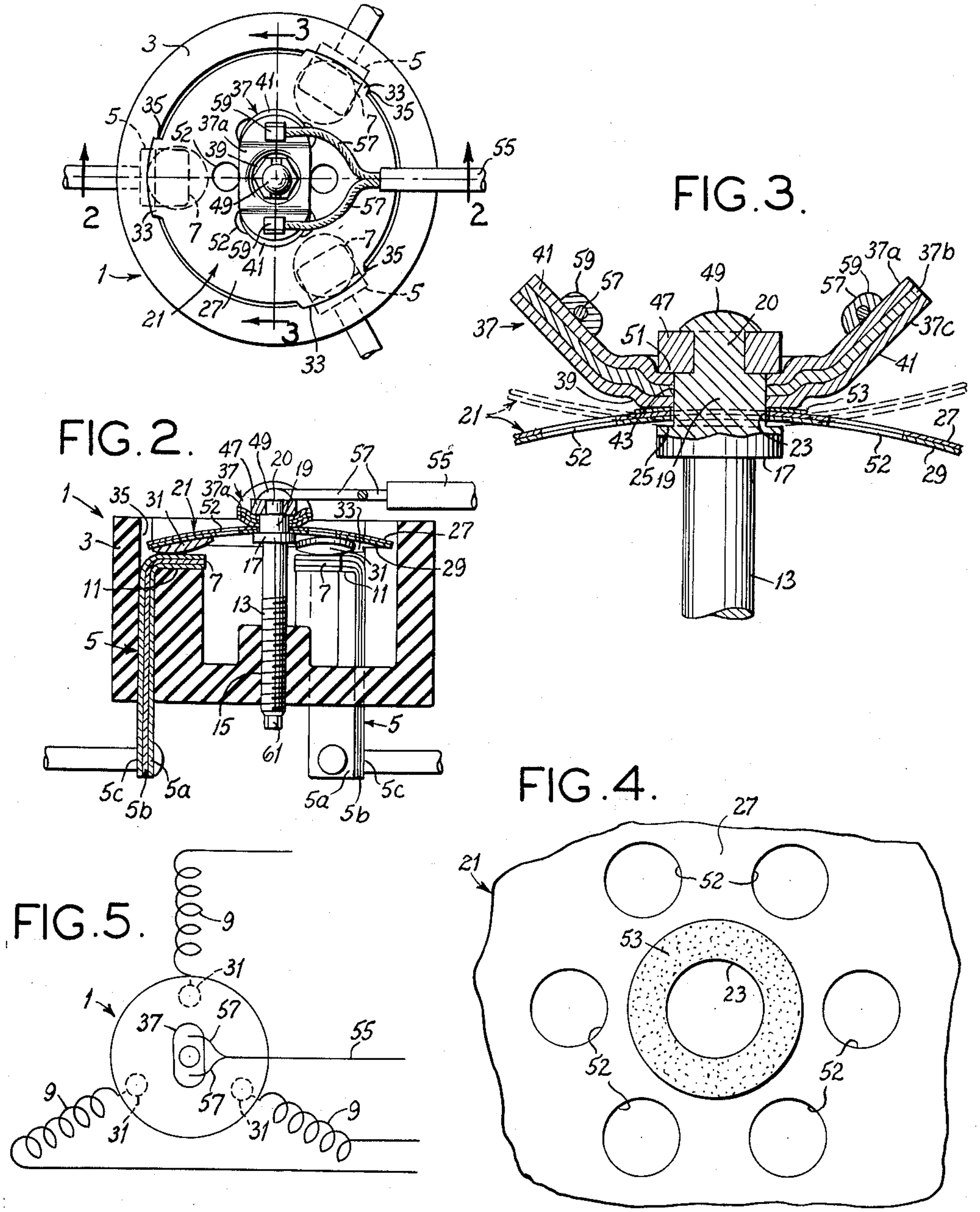
Fig. 2 is a vertical section taken on line 2—2 of Fig. 1 showing the dished snap-acting thermostatic disc of the protector in its normal circuit-closing position.
Fig. 3 is an enlarged fragmentary section taken on line 3—3 of Fig. 1, illustrating the normal circuit-closing position of the disc in solid lines, and the open position of the disc in dotted lines.
Fig. 4 is an enlarged plan of the central portion of the disc per se.
Fig. 5 is a wiring diagram showing how the protector is connected in a three-phase four-wire system.

Referring to the drawings, a thermostatic switch 1 constructed in accordance with this invention is shown to comprise a base 3 constituted by a cup composed of electrical insulation material. Fixed in the base or cup 3 are three terminals, each designated 5. These extend up into the cup from the bottom. The upper end of each terminal is bent over as indicated at 7 to provide a contact. The terminals 5 and their upper contact-forming ends 7 are spaced at 120° intervals around the cup. The lower ends of the terminals project out from the bottom of the cup for connection thereto of the phase windings 9 of a three-phase alternating current motor in the manner illustrated in Fig. 5. The contact-forming ends 7 of the terminals 5 bear on shoulders 11 formed in the cup. Terminals 5 may be formed, for example, of three-layer strip material consisting of a copper-nickel alloy outer layer *5a*, a copper intermediate layer *5b*, and a silver outer layer *5c*. The alloy may, for example, consist of 55% copper and 45% nickel. Each of the ends 7 are bent so that the silver layer *5c* is upward.

A screw 13 is threaded in an opening 15 in the center of the bottom of the cup 3. The screw extends up to the top of the cup. Adjacent its upper end, the screw is formed with a flange 17. Above the flange, the screw has a cylindrical stud portion 19 and a reduced-diameter upper end portion 20 projecting centrally from the upper end of stud 19. The screw 13 serves as means for supporting a dished snap-acting thermostatic disc 21 which may be a bimetallic disc of the type described in Vaughan et al. U.S. Patent 2,585,704, for example. This disc has a center hole 23 (see Fig. 4) having a diameter slightly larger than the diameter of stud 19. The stud extends loosely through the center hole 23 in the disc and the disc bears on the shoulder 25 provided by the flange 17 on the screw. The disc 21 is mounted on screw 13 (which serves as a center post) with its low expansion side 27 up and its high expansion side 29 down. Accordingly, the disc 21 at normal temperatures occupies the upwardly arched position concave with respect to the base in which it is shown in Fig. 2 and in solid lines in Fig. 3. Secured as by welding to the bottom face (the high expansion side) of the disc are three contact buttons 31 engageable with the silver layers *5c* of the fixed terminal contacts 7 on the base when the disc is in its normal upwardly arched position of Fig. 2. Buttons 31 may consist preferably of a silver facing for low resistance contact with silver layers *5c*, on a backing layer of projection-weldable material such as steel, Monel or nickel. Disc 21 is formed with three ears 33. These ears are loosely movable in grooves 35 in the annular wall of cup 3 to maintain the buttons 31 and contacts 7 in register, without restraining the disc from snapping.

Mounted on the stud 19 above the disc 21 is a contact plate 37. This may be made of the same type of material as the terminals 5, its alloy layer being designated *37a*, its intermediate copper layer being designated *37b*, and its silver layer being designated *37c*. It is formed to have a cupped central portion 39 and diverging wing portions 41. The winged contact plate 37 is formed with the silver layer *37c* thereof on the outside, so that the cupped central portion 39 has a silver bottom surface. The cupped central portion 39 has a center hole 43 receiving the upper end of stud 19 with a relatively loose fit such as to allow relative rotation of the contact plate 37 and the screw 13. The silver bottom surface of cupped portion 39 is flat. A washer 47 is applied to the reduced-diameter end portion 20 of the screw and held thereon by riveting over portion 20 as indicated at 49. Washer 47 projects out from stud 19 and the annular portion of the bottom face thereof which lies outward of stud 19 constitutes a shoulder 51 opposed to shoulder 25. The contact plate 37 and disc 21 are held in assembly with the screw between these shoulders. The height of stud 19 and hence the spacing of these shoulders is somewhat greater than the combined thickness of the material of the disc 21 and the material of the contact plate 37. Accordingly, the annular central portion of disc 21 surrounding the center hole 23 therein is relatively free to flex and snap between the upwardly arched configuration concave with respect to the base in which it appears in solid lines in Fig. 3 and the downwardly arched opposite configuration convex with respect to the base in which it appears in dotted lines in Fig. 3, the contact plate 37 being slidable on stud 19.

The disc 21 may be formed with a circular series of perforations 52 around its center hole 23. These perforations are smaller than the center hole. Six such perforations are shown, spaced at 60° intervals, with alternate perforations radially aligned with the contacts 31. The disc 21 is provided on its upper face (its low expansion side) with an annular band 53 of material of high electrical conductivity such as silver surrounding the center hole 23 in the disc. This silver area may be provided by an electrolytic deposition process. The silver is deposited before the buttons 31 are welded to the disc and before the disc is temperature-set or heat-treated. Prior to electroplating with silver, the area surrounding the center hole in the disc is given a preliminary cleaning, if necessary, to remove excessive dirt or oxide film. This cleaning may be accomplished by wire brushing or grinding with an abrasive, or both. Then the disc is electrolytically cleaned in an alkaline solution to remove oil and other foreign matter, treated in an acid bath to remove oxide scale, and washed. Then the disc is sprayed twice with a suitable masking lacquer to mask its entire surface except for the concentric area around the center hole 23 which is to receive the silver. This area is flashed with copper (a minute deposit to improve the bond), and then electroplated with silver by a current reversal method to provide a deposit of silver from 0.0003" to 0.0005" thick on the disc. The current reversal method involves normal current flow for deposition of silver for a period of time, then current reversal for a shorter period of time to remove high points of deposit, this cycle being repeated until the desired thickness of silver is obtained. This method provides a denser silver deposit than can be attained with a continuous unidirectional current flow. Finally, the lacquer is stripped by means of a solvent and the disc is wire-brushed to remove any lacquer residue or loose silver.

At 55 in Figs. 1, 2 and 5 is indicated the neutral wire of a three-phase four-wire system in which the motor phase windings 9 are connected. At its end which is to be connected to the switch 1, this neutral wire is provided with two flexible leads 57. One of these is secured as by welding or brazing at 59 to one wing 41 of the contact plate 37 and the other is secured as by welding or brazing at 59 to the other wing 41 of the contact plate 37. If desired, contact plate 37 may have one winged portion which is connected to one flexible lead.

The lower end of screw 13, which projects from the bottom of cup 3, is formed with a portion 61 engageable by a wrench for turning the screw to adjust it up or down so as to enable the switch to be calibrated, i.e., to set the disc 21 to snap open at a predetermined temperature. The screw can turn in the disc 21 and the contact plate 37 for this purpose. This adjustment of the screw also provides appropriate pressure between disc contacts 31 and fixed contacts 7 and between contact plate 37 and the silver area 53 on the disc when the disc is in its normal upwardly arched Fig. 2 position. When the disc is in this position, the silver area 53 thereon occupies a raised position in low electrical resistance engagement under pressure with the silver bottom of the cupped central portion 39 of the contact plate 37, the latter being backed up against the shoulder 51.

Thus, when the disc is in its normal upwardly arched position of Fig. 2, current paths are established between the phase windings 9 and the neutral wire 55. Each path includes a terminal 5, its contact end 7, a contact 31 on the disc, the disc 21, the silver area 53 on the disc, and the contact plate 37. The connection to the neutral wire 55 is a low electrical resistance connection in comparison to the resistance measured across any two disc contacts 31, the silver area 53 providing a stable low electrical resistance surface which is in firm engagement with the low electrical resistance silver side of the contact plate 37. The provision of the silver surface on the disc is especially important in cases where the disc, because of having a mat finish (see U.S. Patent 2,585,704) and/or oxide film on its low expansion side, would not be conducive to a low electrical resistance pressure contact.

The disc is self-heated by current flowing therethrough, due to its electrical resistance, and is also subject to extraneous heating by proximity to the motor. If, because of overload current in any phase of the motor or excessive extraneous heat, the temperature of the disc should rise to its preset snapping temperature, the disc will then snap from its normal upwardly arched closed position shown in Fig. 2 and in solid lines in Fig. 3 to its open downwardly arched position illustrated in dotted lines in Fig. 3. This snaps contacts 31 away from contacts 7 to break the phase circuits. Since the central portion of the disc is free to slide down on cylindrical portion 19 of screw 13, the snapping of the disc occurs freely. When the disc snaps, its central portion moves down on portion 19 and the pressure on contact plate 37 is relieved, but this does not matter since contact pressure is not necessary when the disc has snapped open. When the disc cools and snaps back to its normal position, contact pressure between the silver area 53 on the disc and the contact plate 37 is restored. The wing portions 41 of plate 37 diverge away from the disc to provide clearance for the disc to snap.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A thermostatic switch comprising a base, contact means fixed on the base, a snap-acting thermostatic element adapted to snap from a first to a second position upon reaching a predetermined temperature, and means for supporting said element on the base, said element having a hole therein, said supporting means having a shoulder and a stud extending from said shoulder through said hole, one side of said element being engageable with said shoulder, said element having contact portions on said one side engageable with said fixed contact means when said element is in its first position, a contact member loosely mounted on said stud on the other side of said element, and means for retaining said contact member and element on said stud, a portion of said element adjacent the hole therein on said other side thereof being in relatively low electrical resistance contact with said contact member when said element is in its said first position, said contact member being adapted for connection of an electrical lead thereto, and said retaining means being spaced from said shoulder a distance such that the portion of said element around the hole is free to snap.

2. A thermostatic switch comprising a base, contact means fixed on the base, a snap-acting thermostatic element adapted to snap from a first to a second position upon reaching a predetermined temperature, and means for supporting said element on the base, said element having a hole therein, said supporting means having a shoulder and a stud extending from said shoulder through said hole, one side of said element being engageable with said shoulder, said element having contact portions on said one side engageable with said fixed contact means when said element is in its first position, a contact member mounted on said stud on the other side of said element, and means for retaining said contact member and element on said stud, said element having a layer of low electrical resistance material thereon adjacent the hole therein on said other side thereof, said contact member having a low electrical surface opposed to and engageable under pressure by said layer on said element when said element is in its said first position, said contact member being adapted for connection of an electrical lead thereto, and said retaining means being spaced from said shoulder a distance such that the portion of said element around the hole is free to snap.

3. A thermostatic switch comprising a base, contact means fixed on the base, a snap-acting thermostatic disc adapted to snap from a first to a second position upon reaching a predetermined temperature, and means for supporting said disc on the base, said disc having a center hole, said supporting means having a shoulder and a stud extending from said shoulder through said hole, one side of said disc being engageable with said shoulder, said disc having contacts on said one side engageable with said fixed contact means when said disc is in its first position, a contact plate loosely mounted on said stud on the other side of said disc, and means for retaining said contact plate and disc on said stud, a portion of said disc adjacent its center hole on said other side thereof being in relatively low electrical resistance contact with said contact plate when said disc is in its said first position, said contact plate being adapted for connection of an electrical lead thereto, and said retaining means being spaced from said shoulder a distance such that the portion of said disc around its center hole is free to snap.

4. A thermostatic switch comprising a base, contact means fixed on the base, a snap-acting thermostatic disc adapted to snap from a first to a second position upon reaching a predetermined temperature, and means for supporting said disc on the base, said disc having a center hole, said supporting means having a shoulder and a stud extending from said shoulder through said hole, one side of said disc being engageable with said shoulder, said disc having contacts on said one side engageable with said fixed contact means when said disc is in its first position, a contact plate mounted on said stud on the other side of said disc, and means for retaining said contact plate and disc on said stud, said disc being plated with a low electrical resistance material thereon over an annular area surrounding its center hole on said other side thereof, said contact plate having a low electrical resistance surface opposed to and engageable under pressure by said low electrical resistance material on said disc when said disc is in its said first position, said contact plate being adapted for connection of an electrical lead thereto, and said retaining means being spaced from said shoulder a distance such that the portion of said disc around its center hole is free to snap.

5. A thermostatic switch comprising a base, contact means fixed on the base, a snap-acting thermostatic disc adapted to snap from a first to a second position upon reaching a predetermined temperature, and a screw threaded in the base for adjustably mounting said disc on the base, said disc having a center hole, said screw having a shoulder and a stud extending from said shoulder through said hole, one side of said disc being engageable with said shoulder, said disc having contacts on said one side engageable with said fixed contact means when said disc is in its first position, a contact plate loosely mounted on said stud so as to be rotatable relative to the screw on the other side of said disc, and means for retaining said contact plate and disc on said stud, said disc being plated with a low electrical resistance material thereon over an annular area surrounding its center hole on said other side thereof, said contact plate having a low electrical resistance surface opposed to and engageable under pressure by said low electrical resistance material on said disc when said disc is in its said first position, said contact plate being adapted for connection of an electrical lead thereto, and said retaining means being spaced from said shoulder a distance greater than the combined thickness of the disc and plate so that the portion of said disc around its center hole is free to snap.

6. A thermostatic switch as set forth in claim 5 wherein said contact plate is formed of multi-layer metallic material having a layer of low electrical resistance metal at the face thereof toward the disc.

7. A thermostatic switch as set forth in claim 6 wherein said contact plate has wing portions diverging away from the disc providing clearance for the disc to snap and adapted for connection thereto of lead wires.

8. A protector for a three-phase alternating current motor to be connected in a three-phase four-wire system which includes a neutral wire, said protector comprising a base, three contacts fixed on the base, a snap-acting thermostatic disc adapted to snap from a first position concave with respect to the base to a second position convex with respect to the base upon reaching a predetermined temperature, a screw threaded in the base for adjustably mounting said disc on the base, said disc having a center hole, said screw having a shoulder and a stud extending from said shoulder through said hole, the one side of said disc toward the base being engageable with said shoulder, said disc having three contacts on said one side engageable with said fixed contacts on the base when said disc is in its first position, a contact plate loosely mounted on said stud so as to be rotatable relative to the screw on the other side of said disc, a washer at the end of the stud for retaining said contact plate and disc on said stud, said disc being plated with a low electrical resistance material thereon over an annular area surrounding its center hole on said other side thereof, said contact plate having a low electrical resistance surface opposed to and engageable under pressure by said low electrical resistance material layer on said disc when said disc is in its said first position, said contact plate being adapted for connection of the neutral wire thereto, and said washer being spaced from said shoulder a distance greater than the combined thickness of the disc and plate so that the portion of said disc around its center hole is free to snap.

9. A protector as set forth in claim 8 wherein said contact plate is formed of multi-layer metallic material having a layer of low electrical resistance metal at the face thereof toward the disc.

10. A protector as set forth in claim 8 wherein said contact plate has wing portions diverging away from the disc providing clearance for the disc to snap and adapted for connection thereto of lead wires.

References Cited in the file of this patent

UNITED STATES PATENTS

| | | |
|---|---|---|
| 1,952,895 | Ross | Mar. 27, 1934 |
| 2,420,300 | Cataldo et al. | May 13, 1947 |
| 2,585,704 | Vaughan et al. | Feb. 12, 1952 |
| 2,651,696 | Seely | Sept. 8, 1953 |